US008960218B1

(12) United States Patent
Rowe

(10) Patent No.: US 8,960,218 B1
(45) Date of Patent: Feb. 24, 2015

(54) VALVE CONTROL SYSTEM FOR FOAM GENERATING APPARATUS

(71) Applicant: Carroll G. Rowe, Washington, AR (US)

(72) Inventor: Carroll G. Rowe, Washington, AR (US)

( * ) Notice: Subject to any disclaimer, the term of this patent is extended or adjusted under 35 U.S.C. 154(b) by 0 days.

(21) Appl. No.: 14/273,761

(22) Filed: May 9, 2014

Related U.S. Application Data

(60) Provisional application No. 61/821,500, filed on May 9, 2013.

(51) Int. Cl.
*A62C 5/02* (2006.01)
*F16K 37/00* (2006.01)

(52) U.S. Cl.
CPC .................................... *A62C 5/024* (2013.01)
USPC ................................ 137/88; 137/554; 169/14

(58) Field of Classification Search
CPC ..... F16K 37/0041; A62C 35/68; A62C 5/022
USPC ................. 137/88, 553, 554, 556; 169/14, 44
See application file for complete search history.

(56) References Cited

U.S. PATENT DOCUMENTS

| | | | | | |
|---|---|---|---|---|---|
| 2,858,843 | A | * | 11/1958 | Muller | 137/172 |
| 4,311,165 | A | * | 1/1982 | Rose, Jr. | 137/355.12 |
| 5,427,140 | A | * | 6/1995 | Bosanquet | 137/554 |
| 7,784,490 | B1 | * | 8/2010 | Stewart et al. | 137/556 |
| 2004/0177975 | A1 | * | 9/2004 | Laskaris et al. | 169/13 |

OTHER PUBLICATIONS

Elkhart Brass Unibody series Intelligent CAF Selector (dated 2011, retrieved from www.elkhartbrass.com).
KZCO SL-1 Users Guide (undated).
Electrical and Electronic Components catalog, Hale Products (dated 2009).
Akron Brass Company Navigator Valve Controller with Pressure Meter and Flow Meter product description (retrieved from www.akronbrass.com), (dated Aug. 8, 2014).

* cited by examiner

*Primary Examiner* — Atif Chaudry

(57) ABSTRACT

A valve control system for a compressed air foam generation apparatus includes a control board with a scrolling light display to indicate the quality of foam being produced. The control board is coupled to a manually operated valve by a string potentiometer. The string potentiometer connects at a ring coupled to the valve, such that turning of the valve causes the string potentiometer cable to extend or retract, thereby indicating the degree to which the solution valve is opened.

7 Claims, 3 Drawing Sheets

VALVE CONTROL SYSTEM FOR FOAM GENERATING APPARATUS

CROSS-REFERENCE TO RELATED APPLICATIONS

This application claims the benefit of U.S. provisional patent application No. 61/821,500, entitled "Valve Control System for Foam Generating Apparatus," filed on May 9, 2013. Such application is incorporated herein by reference in its entirety.

STATEMENT REGARDING FEDERALLY SPONSORED RESEARCH OR DEVELOPMENT

Not applicable.

BACKGROUND OF THE INVENTION

Various compressed air foam systems (CAFS) have been used in firefighting applications for some time. In its most basic form, a CAFS is simply a means for mixing air and water with a surfactant in order to produce a water-based foam that is used to extinguish fires. A CAFS provides quicker "knockdown" against potent fires, deeper penetration of fuels, and gives firefighters the advantage of making their initial attack against a fire from a significantly greater distance than with a traditional water stream or fog pattern. The bubble structure allows for greater expansion of delivered water surface area, allowing for greater heat reduction compared to equal amounts of plain water. Foam blankets allow for pre-treatment of fuels that are not already involved in the fire, and have less adverse impact on property, as well as helping to prevent damage to evidence used for fire investigations. In fact, some studies have indicated that CAFS increases the effectiveness of water as an extinguishing agent by approximately a factor of five. CAFS may be particularly valuable for rural fire departments, because the use of foam reduces the amount of water required to extinguish a fire, and rural departments are often quite limited in the amount of water that they have available at any particular fire.

A typical CAFS allows for the manipulation of the ratio of liquid to air that is mixed to produce the CAFS flow. Different consistencies of foams have proven superior or inferior for different firefighting applications. The foams thus produced may vary from a "dry" foam with a consistency similar to shaving cream, to a "wet" foam that is of a consistency more similar to a runny semi-liquid. In addition, there may be certain applications where it is more desirable to provide a stream of solution (water and surfactant) without the introduction of air that would produce a foam. A solution stream has been shown to be more effective than simple water in suppressing certain types of fires, and there are firefighting applications where such a solution stream is deemed more desirable than the use of CAFS foams.

While the ability to control the mixing ratio of water to air is thus desirable, existing systems that allow a firefighter to control this mixing ratio suffer from a number of disadvantages. Typically, the valve used in a CAFS is a standard, quarter-turn ball valve. This type of valve does not increase or decrease water flow in a manner that is proportional to the degree of rotation of the valve handle. For example, turning the ball valve one-half of the way from the fully closed to the fully open position (i.e., a one-eighth of a circle turn) does not represent a flow rate that is one-half of the fully open valve flow rate. Thus a firefighter cannot judge the rate of flow for the water that is being delivered simply by gauging the lever position as a linear indication of the degree of rotation of the ball valve. It would thus be desirable to provide a control mechanism to the firefighter operating a CAFS that would provide an easily and quickly understood indicator of the volume of flow being provided for mixing in the CAFS.

Another limitation of existing CAFS control systems is that they are difficult to read in the conditions often encountered by firefighters. A standard gauge, for example, may be used to indicate flow levels, but it may be difficult for a firefighter in the context of fighting a fire to read these gauges. Various conditions, such as darkness, rain or snow, heavy smoke, fog, and other difficult conditions often encountered by firefighters exacerbate this problem. It would be desirable to provide a high visibility, easily and quickly read control system and mixing indicator that allows a firefighter to quickly and accurately manipulate CAFS mixing and flow during even the most difficult firefighting conditions. Such a system would allow the operator to turn the control valve to a position and know the quality of foam that will be produced, without the necessity of checking the resulting stream and making adjustments based on the observed results. Such a system would also desirably include an easily and quickly readable output display to indicate CAFS quality to the operator during use.

The art includes scrolling light feedback displays for certain firefighting purposes. For example, the Hale Class 1 ITL-40 display is intended to be used to indicate liquid volume in either a water or foam tank. This display is capable of providing up to nine separate gradations that are visually displayed as a scrolling light pattern in changing colors, passing from red, to orange, to blue, to green as volume increases. Another example is the KZValve KZCO SL-1, which is a scrolling light type control box used to indicate water valve position, utilizing five LED scroll lights. By movement of a toggle switch connected to a motorized valve, water valve position may be controlled. Water flow is indicated by selectively lighting the scroll lights as flow increases, with up to ten distinct positions between the valve being fully open and fully closed with this device. While this device does provide an easily read display to the operator, it does not address the problem that the degree to which a valve is opened does not necessarily reflect a particular foam quality.

The art also includes at least one attempt to use a scrolling light type display for use specifically with CAFS production. Elkhart Brass Mfg. Co. of Elkhart, Ind. produces an electric valve for CAFS systems under the name ICS (Intelligent CAF Selector). The ICS includes a control panel that allows for push-button switching between CAFS production and water-only mode. It also allows for a "CAF SELECT" mode to toggle between pre-set CAFS discharge settings, i.e., wet, medium, and dry. Although ten LED scrolling lights are used to indicate the degree to which the water valve is open, the only means of adjusting foam quality is by using the "CAFS SELECT" button to toggle between three possible settings, or to choose "water only" by turning CAFS off. The scrolling lights indicate only the degree to which the water valve is open, not the quality of foam being produced.

It may be seen that the scrolling light display systems described above require the use of a motorized, or electric, water valve system. Many CAFS systems, however, use a manually opened or closed water valve. These may be preferred for certain operators due to a lower cost, ease of use, and increased reliability in harsh conditions. Compactness is also an issue, since the space available for equipment and piping on CAFS-equipped firefighting vehicles tends to be quite limited. A system that offered the advantages of a scrolling light display that provided direct feedback about foam quality, and that allowed for such a display in conjunction with a manual water valve, would thus be highly desirable.

Devices or references mentioned in this background section are not admitted to be prior art with respect to the present invention.

BRIEF SUMMARY OF THE INVENTION

The present invention is directed to a manual-valve control system for a foam generating apparatus that provides an indicator comprising multiple scrolling lights to indicate the quality of foam being produced in a CAFS. The valve position is communicated to the control system utilizing a linear sensor, which in certain embodiments may be a string potentiometer coupled with a ring. In this way, the position of the valve may be directly communicated to the control system without the requirement of employing an electric valve or electronic components. In various embodiments, the indicator lights may be programmable to indicate any desired foam quality, such that a firefighter needs to simply move the valve until the desired indicator light is lit. In addition, in various embodiments the indicator lights may be of different colors to more easily distinguish different foam qualities without the necessity of counting lights. Certain embodiments may comprise a system that automatically turns off the delivery of air in low solution flow conditions as a safety measure, or delay the flow of air upon initialization to ensure that air is not delivered without liquid present. The present invention thus makes production of a particular quality of foam in a CAFS much easier, particular in the difficult conditions often encountered in actual firefighting situations, without the need for complex electronics.

DETAILED DESCRIPTION OF THE PREFERRED EMBODIMENT(S)

Figure 1:
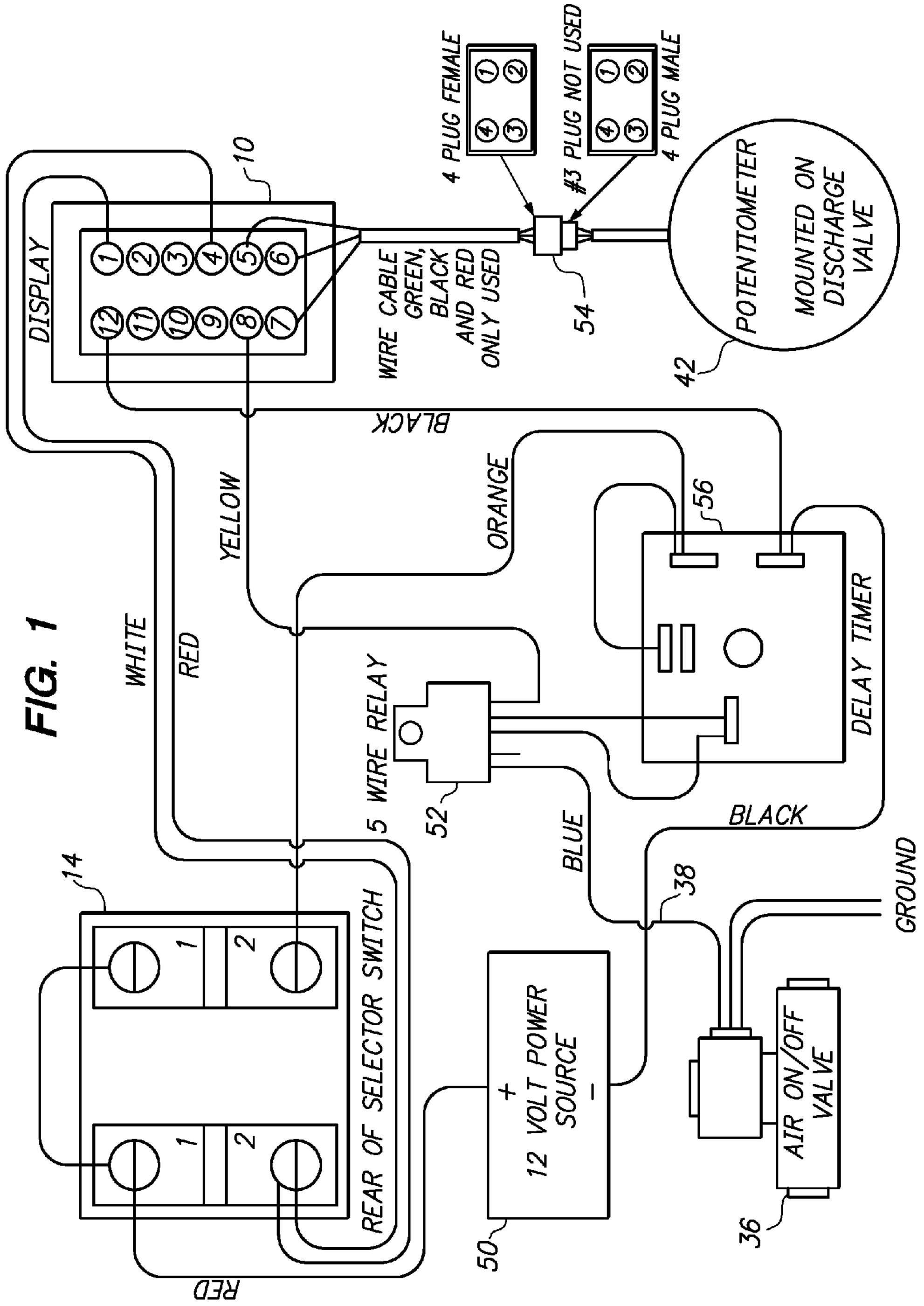
FIG. 1 is an electrical wiring diagram for a preferred embodiment of the present invention.
Figure 2:
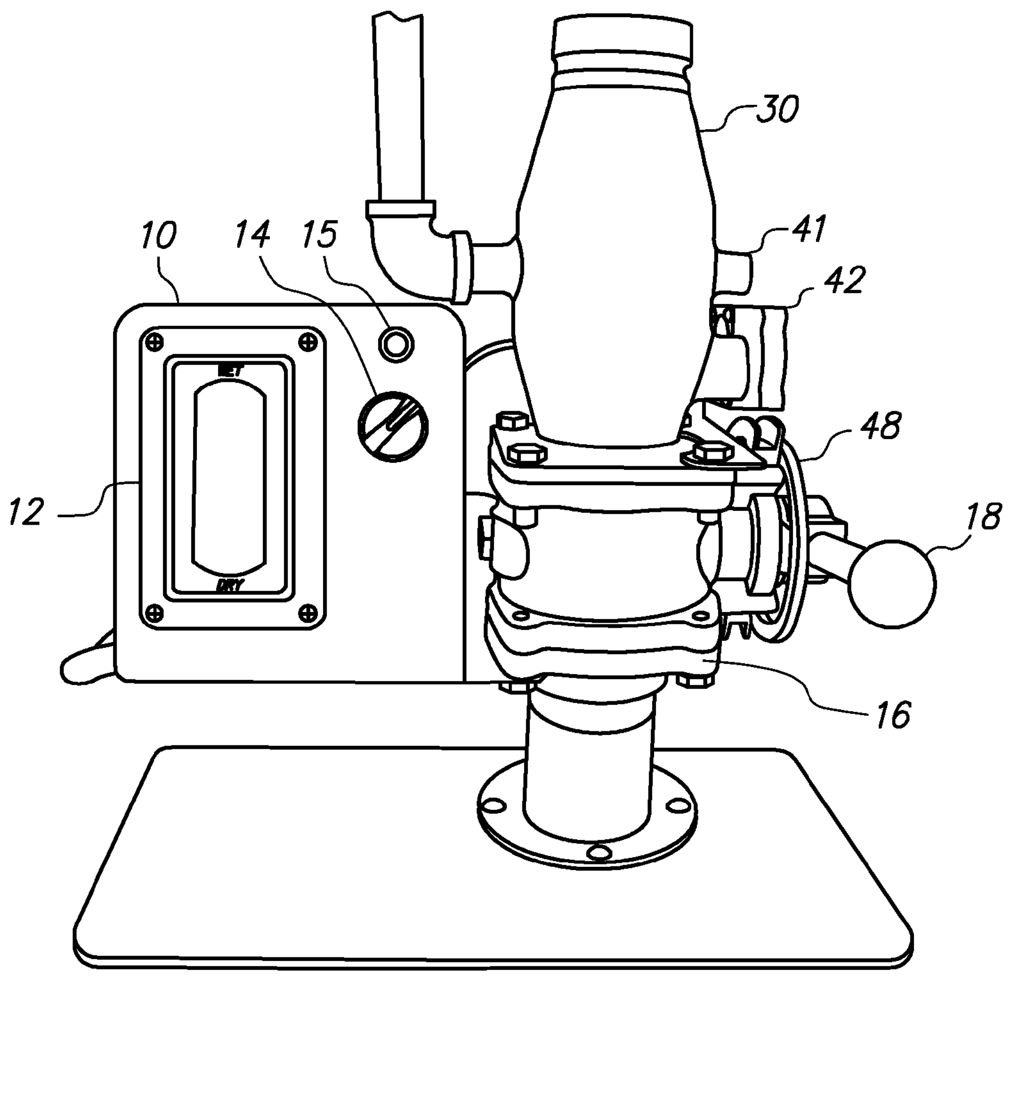
FIG. 2 is a front elevational view of a preferred embodiment of the present invention.
Figure 3:
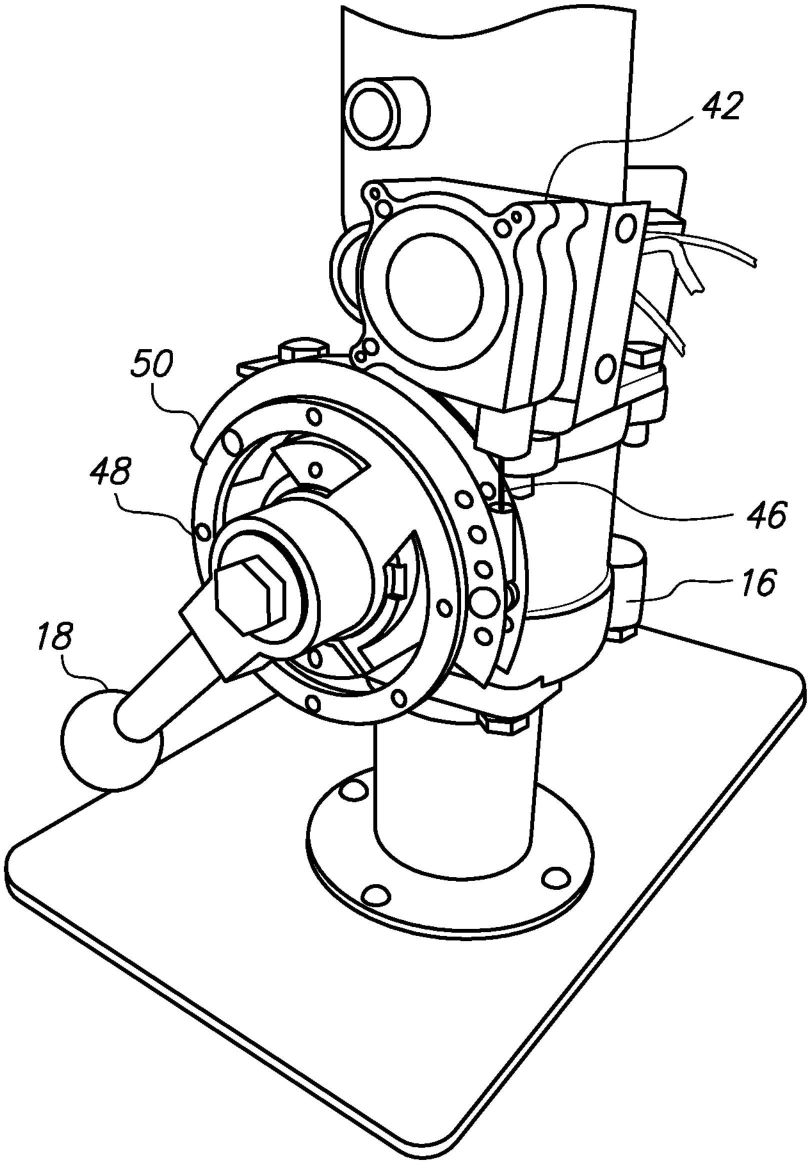
FIG. 3 is a side elevational view of a preferred embodiment of the present invention.

With reference to FIGS. 1-3, a preferred embodiment of the invention may now be described.

As shown in FIGS. 2 and 3, the CAFS system of the preferred embodiment directs water through ball valve 16 to mixing chamber 30. In the preferred embodiment, ball valve 16 is a typical quarter-turn ball valve, as well known in the art. Control of ball valve 16 is provided by ball valve handle 18, such that manual turning of handle 18 causes ball valve 16 to open, close, or reach a partially open position, in conjunction with the position of handle 18. It may be understood by those familiar with ball valves, however, that the proportion of flow allowed by ball valve 16 is not directly proportional to the degree to which handle 18 is turned between its fully closed and fully open position. For example, turning handle 18 to the half-open position does not result in a flow volume that is half-way between maximum flow and no flow. In the preferred embodiment, ball valve 16 is positioned such that handle 18 is within reach of the operator who controls the CAFS equipment during a firefighting operation. In alternative embodiments, a remote linkage mechanism may be used to connect handle 18 with ball valve 16, such as in the case where the positioning of ball valve 16 on a vehicle is such that the operator could not easily reach a handle directly attached to ball valve 16.

Control board 10, which is positioned within view of the operator, preferably includes a number of indicator lights 12. In the preferred embodiment, eight indicator lights 12 are presented, but various embodiments may include any number of indicator lights 12. More specifically, a Hale Class 1 ITL-40 tank level indicator may be used to provide indicator lights 12 of control board 10. This device provides eight indicator lights 12 stacked in a vertical fashion. From bottom to top, there are two red, two orange, two blue, and two green. While in the intended application for the ITL-40 the lights indicate tank level, they are used in the preferred embodiment of the present invention to indicate foam quality from very dry (corresponding to red indicator lights 12) up to very wet (corresponding to all of the scrolling indicator lights up to the green lights 12 being lit). A written or graphic indicator of the meaning of each corresponding indicator light 12 being lit may be provided on the visible surface of control board 10, or in alternative embodiments this information may be omitted.

The preferred embodiment also includes an on/off switch 14 on control board 10. On/off switch 14 is preferably a rotary, dial-type switch with two positions. The purpose of the on/off switch 14 is to control the overall operation of the device. Further, the preferred embodiment includes air light 15 on control board 10. Air light 15 is preferably an LED light that, when lit, indicates that the flow of air from a compressed air source to air inlet 41 on mixing chamber 30 has been activated. This provides a visual confirmation concerning air flow to the operator; this is desirable as a safety feature since the flow of air without the flow of water could create a serious safety hazard in a firefighting situation.

Preferably, control board 10 is positioned on the CAFS truck or other system such that it is easily visible to a firefighter or operator who is in position to manipulate handle 18 connected to ball valve 16. (Alternatively, ball valve 16 may be remotely linked to handle 18.) Handle 18 may, for example, extend just to the right of control board 10, such that an operator may easily manipulate handle 18 to any desired position while not removing his or her focus from control board 12. It may be seen that by calibrating each of indicator lights 12 to light up at a particular position of handle 18, the lighting of indicator lights 12 may be matched to actual CAFS quality. This is true because when it is activated, the flow of pressurized air remains the same at all times—either in the full on or off position—and thus the quality of the foam is determined by the volume of water presented into the mix of solution and air presented to mixing chamber 30. As previously noted, the relationship between the position of ball valve 16 and the quality of the foam is not linear, but the ability to calibrate by setting each of the indicator lights 12 to a particular position of ball valve 16 allows the user to arrange the indicator lights 12 as desired in correspondence with particular foam settings.

In an optional feature according to a preferred embodiment of the invention, the CAFS may include functionality to automatically cut off the flow of air to mixing chamber 30 when the flow of water into mixing chamber 30 has dropped below a certain set volume per unit time. If ball valve 16 is fully closed such that no solution is allowed to pass into mixing chamber 30, it would be desirable to automatically cut off the flow of air to mixing chamber 30 as well, since otherwise the fire hose connected to the system would be delivering air alone. As noted above, the delivery of only air could result in a potential hazard, since the air may actually feed a fire at which the fire hose is directed. In addition, there may be certain very low levels of solution flow for which the foam becomes so thin that it is not desirable for any firefighting application, so the set level of flow at which this air cut-off is activated may be a flow rate above zero. Regardless of the air cut-off flow rate, an air valve 36 (shown in FIG. 1) may be included in order to implement this functionality. In the preferred embodiment, air valve 36 may be of the solenoid type, such that it is opened and closed by an electrical signal. Control board 10 is connected to the solenoid of air valve 36 by air control wire 38 (shown in FIG. 1), the purpose of which is to deliver an "open" or "close" signal to the solenoid of air valve 36. By means of the control circuitry of control board 10, in the preferred embodiment the threshold at which the flow of air to mixing chamber 30 is cut off may be programmable. In an alternative embodiment, it may be simply set to zero or to a low non-zero flow rate as a base-level safety precaution. In either case, air light 15 will be lit to show the operator whether the flow of air from pressurized air source 22 is enabled at any given time during operation of the device.

Returning now to FIG. 3, the apparatus for coupling ball valve 16 with control board 10 may be further described according to a preferred embodiment. String potentiometer 42 is a type of linear sensor electrically connected to control board 10 to provide a signal that is proportional in its voltage to the position of ball valve 16. A string potentiometer is a transducer that may be used to measure linear position by means of a flexible cable that is attached to a spring-loaded spool. As the cable extends from the device, the spring-loaded spool is turned, and the turning of the spool on the shaft is measured by a rotational sensor, such as a potentiometer or an encoder. Thus the movement of the cable extending from string potentiometer 42 may be measured and fed to control board 10. In the preferred embodiment, a compact string potentiometer such as the Celesco SP2 "string pot" device from Celesco Transducer Products, Inc. of Chatsworth, Calif. may be employed, although the invention is not so limited. The cable of the Celesco SP2 has a convenient loop at its distal end that is useful in coupling the device with ball valve 16, as described following.

String potentiometer 42 of the preferred embodiment is coupled to ball valve 16 and handle 18 by means of ring 48 and winder 50. Ring 48 is connected to ball valve 16 such that movement of handle 18 causes ring 48 to rotate proportionally to the opening and closing of ball valve 16. Winder 50 is attached to the outer circumference of ring 48, and provides one or more attachment points for the cable extending from string potentiometer 42. In the preferred embodiment, the end of the cable of string potentiometer 42 may be attached to winder 50 by means of a bolt passing through holes in flanges of winder 50 that extend to either side of the end of string potentiometer 42. Preferably, numerous bolt holes are provided in winder 50 to allow for adjustment of the coupling with ring 48. In alternative embodiments, only one such bolt hole may be presented, and in still other alternative embodiments ring 48 may be omitted and the cable of string potentiometer 42 attached directly to ring 48. It may be seen that as a result of the operation of the preferred embodiment as herein described, the degree of rotation of handle 18—and thus, correspondingly, the degree to which ball valve 16 has been opened—is proportional to a voltage produced as an output by string potentiometer 42. In alternative embodiments, other types of sensors may be used, such as rotary encoders as are well known in the art. In addition, other types of signals other than voltage may be output in order to signal position, such as, for example, a change in amperage produced by a transducer in communication with ball valve 16.

Turning now to FIG. 1, the primary electrical connections of the preferred embodiment of the present invention may now be described. Electrical potential source 50 provides power to the device; it may be the battery of a vehicle itself, or it may be a connection within the electrical system of the vehicle to which the device has been mounted. On/off switch 14 has, at its rear, electrical connectors that receive power from potential source 50, and allows switching of power to the device through on/off switch 14. Power leads from on/off switch 14 connect to control board 10 in order to provide power to control board 10 when on/off switch 14 is on the "on" position. String potentiometer 42 is wired to control board 10 through a four-plug connector 54, although the connector may be omitted in alternative embodiments. It may be seen that only three wires are needed for the connections between string potentiometer 42 and control board 10, two leads being for power and the third being the signal wire whose voltage level is proportional to the degree to which the cable of string potentiometer 42 is extended by turning of handle 18 on water valve 16.

The controls for air valve 36 are provided through 5-wire relay 52. Wire relays of this type are well known in the art. It may be seen from FIG. 1 that introduced into the circuit between control board 10 and 5-wire relay 52 is delay timer 56. Such devices are also well known in the art. The purpose of such devices is to convert a momentary or continuous trigger signal into a timed output. Delay timer 56 is desirable in the preferred embodiment of the invention in order to avoid the dangerous situation that could occur upon initialization of control board 10 if air is introduced into the system without a liquid flow being received through ball valve 16. In the preferred embodiment, delay timer 56 is set to provide a signal delay of about 4 seconds to the operation of air valve 36 through 5-wire relay 52, which is the time required for control board 10 initialization. Other settings of delay timer 56 are possible in alternative embodiments, or delay timer 56 may be removed in certain alternative embodiments. Air control wire 38 sends a signal to the solenoid of air valve 36 so long as there is any measurement of flow through ball valve 16, that is, so long as any of the lights on control board 10 are lit. When there is no flow at ball valve 16, the signal from control board breaks the circuit at relay 52, thereby causing air control wire 38 to turn off air valve 36. Delay timer 56 thus prevents the flow of air through air valve 36 while the system is initializing.

The structure of the preferred embodiment of the present invention having been described, the operation of the preferred embodiment during foam production will next be discussed. The CAFS is activated by the movement of handle 18 from a fully closed position to a partially or fully opened position. As handle 18 moves from closed toward open, indicator lights 12 on control board 10 will begin to light in a bottom-up fashion. In addition, movement of handle 18 from the fully closed position toward the fully open position will momentarily cause an "open" signal to be sent from control board 10 along air control wire 38 to the solenoid of air valve 36, thereby activating the flow of air through air inlet 41 into mixing chamber 30, after the requisite delay as programmed at delay timer 56. Because the pressure of air introduced into mixing chamber 30 is constant—either fully delivered or turned off—the operator will have an immediate, easily read indication of the precise rate of flow to mixing chamber 30 as indicated by the step-wise increments of flow rate to which each of the indicator lights 12 are programmed. If, for example, a relatively "wet" foam is desired for a particular firefighting application, the operator may know that a position in which the five bottom-most indicator lights 12 are lit will provide the desired foam consistency for that application. Wet foam may be desired, for example, for particularly hot fires. The operator may turn handle 18 until those five indicator lights 12 are lit, an operation that may typically be performed in a second or less. The operator need not interpret gauges or dials, and the operator need not check the consistency of foam being sent from the connected fire hose in a trial-and-error approach in order to be confident that the desired foam consistency is being delivered for that application. Alternatively, a dryer foam may be desired for other types of fires or applications, such as when an adjacent structure is at risk of catching fire and a coating is needed to insulate the structure from the fire. Dryer foam is often desirable, if possible, since less water is required to produce an equivalent amount of foam. So if, for example, the operator knows that the dry foam desired corresponds with only two indicator lights 12 being lit, the operator may simply move handle 18 until the appropriate indicator lights 12 only are lit. Again, this may take as little as a second or less when moving from another other foam setting. This overall process, as may be seen, can save time during a firefighting operation, bringing the output of the CAFS system to the optimum consistency for a particular application very quickly. Even a few seconds of time saved may make a significant difference in the ability of firefighters to prevent loss of property or even loss of life while fighting a fire. In addition, it will be apparent that indicator lights 12 of a CAFS incorporating the preferred embodiment will be highly visible, even when the operator is facing firefighting conditions that hamper visibility, such as darkness, various forms of precipitation such as rain, ice, or snow, and even when the air may be filled with smoke or fog.

While the preferred embodiment has been described with reference to certain CAFS firefighting equipment, it may be understood by those skilled in the art that the invention is not so limited. The invention finds application wherever it is desirable to produce a mixture of a gas and one or more liquids to produce a foam and where the ability to easily and quickly manipulate the ratio of the mixture to produce a certain foam consistency is desirable.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention.

I claim:

1. A compressed air foam system, comprising:

a. a liquid source;

b. a compressed gas source;

c. a mixing chamber connected to the liquid source and the compressed gas source and configured to produce a foam;

d. a liquid valve positioned in a flow path between the liquid source and the mixing chamber and comprising a liquid valve position lying within a range inclusively between a fully closed position and a fully open position;

e. a foam quality indicator;

f. a string potentiometer comprising a cable in communication with the liquid control valve and the foam quality indicator, wherein the string potentiometer is configured to output to the foam quality indicator a selected liquid flow signal dependent on the liquid valve position;

g. a liquid valve ring connected to the liquid valve;

h. a winder connected to the liquid valve ring and to a distal end of the cable of the string potentiometer, whereby changing the position of the liquid valve causes the cable of the string potentiometer to extend or retract, further wherein the winder comprises a plurality of attachment points, and wherein the distal end of the cable of the string potentiometer is connected to the winder at one of the plurality of attachment points; and i. a handle linked to the liquid valve.

2. The compressed air foam system of claim 1, wherein the attachment points comprise pin holes, and wherein the distal end of the cable of the string potentiometer is connected to the winder at one of the plurality of attachment points by means of a pin passing through one of the pin holes and through a loop at the distal end of the cable of the string potentiometer.

3. The compressed air foam system of claim 1, wherein the foam quality indicator is a scrolling light display.

4. The compressed air foam system of claim 3, wherein the scrolling light display comprises a plurality of lights, and wherein the scrolling light display is operable to light a number of the plurality of lights in correlation to foam quality.

5. The compressed air foam system of claim 1, further comprising:

a. a compressed gas valve in a flow path between the compressed gas source and the mixing chamber;

b. a compressed gas valve solenoid connected to the compressed gas valve; and c. a compressed gas valve relay electrically connected between the foam quality indicator and the compressed gas valve solenoid and operable to send a signal to the compressed gas valve solenoid to open or close the compressed gas valve.

6. The compressed air foam system of claim 5, wherein the compressed gas valve relay is configured to send a first signal to the compressed gas valve solenoid to open the compressed gas valve if the liquid flow is above at or above a threshold liquid flow value, and further operable to send a second signal to the compressed gas valve solenoid to close the compressed gas valve if the liquid flow is at or below a threshold liquid flow value.

7. A valve controller for a compressed air foam system comprising a liquid valve and an air valve, the valve controller comprising:

a. a display;

b. a control board; and c. a sensor connected to the liquid valve and in electrical communication with the control board, wherein the sensor comprises (i) a position ring connected to the liquid valve, (ii) a winder attached at an outer circumference of the position ring, wherein the winder comprises a plurality of cable connected points, and (iii) a string potentiometer comprising a cable connected to the winder at one of the plurality of cable connection points;

wherein the control board is configured to receive a first electrical signal from the sensor wherein the first electrical signal has a value proportional to a position of the liquid valve, and the control board is further configured to send a second electrical signal to the display in response to the first electrical signal from the sensor wherein the second electrical signal has a value that is indicative of a quality of foam being produced by the compressed air foam system.

* * * * *